(12) United States Patent
Katsuki et al.

(10) Patent No.: US 10,395,283 B2
(45) Date of Patent: Aug. 27, 2019

(54) TRAINING AN ESTIMATION MODEL FOR PRICE OPTIMIZATION

(71) Applicant: INTERNATIONAL BUSINESS MACHINES CORPORATION, Armonk, NY (US)

(72) Inventors: Takayuki Katsuki, Tokyo (JP); Tetsuro Morimura, Tokyo (JP); Hiroki Yanagisawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 15/223,512

(22) Filed: Jul. 29, 2016

(65) Prior Publication Data

US 2018/0033059 A1 Feb. 1, 2018

(51) Int. Cl.
G06Q 30/02 (2012.01)
G06N 20/00 (2019.01)

(52) U.S. Cl.
CPC ......... G06Q 30/0283 (2013.01); G06N 20/00 (2019.01)

(58) Field of Classification Search
CPC ......... G06Q 10/00; G06Q 40/00; G06F 17/60
USPC .............................. 705/7.29, 7.35
See application file for complete search history.

(56) References Cited

U.S. PATENT DOCUMENTS

| | | | |
|---|---|---|---|
| 6,842,719 B1 * | 1/2005 | Fitzpatrick ............. | G06Q 10/06 340/286.09 |
| 8,200,527 B1 * | 6/2012 | Thompson ......... | G06Q 10/0639 705/7.39 |
| 8,255,265 B2 * | 8/2012 | Warier .................... | G06Q 10/04 705/7.31 |
| 8,694,346 B2 | 4/2014 | Crean et al. | |
| 2004/0054572 A1 * | 3/2004 | Oldale .............. | G06F 17/30699 706/1 |
| 2005/0149381 A1 | 7/2005 | Ravulapati et al. | |
| 2010/0106555 A1 * | 4/2010 | Mneimneh ............. | G06Q 10/04 705/7.31 |
| 2011/0004506 A1 * | 1/2011 | May ........................ | G06Q 10/04 705/7.29 |
| 2011/0071883 A1 * | 3/2011 | Warier ................... | G06Q 10/04 705/7.31 |
| 2011/0196718 A1 * | 8/2011 | Kulkarni ................ | G06Q 10/00 705/7.31 |

(Continued)

OTHER PUBLICATIONS

Mike et al "Predictive Modeling for Life Insurance", Apr. 2010, Deloitte Consultant LPP, pp. 1-29.*

(Continued)

*Primary Examiner* — Romain Jeanty
(74) *Attorney, Agent, or Firm* — Tutunjian & Bitetto, P.C.; Vazken Alexanian (57) ABSTRACT

A non-transitory computer readable storage medium having instructions embodied therewith, the instructions executable by a processor or programmable circuitry to cause the processor or programmable circuitry to perform operations including obtaining training data including a sample value of one or more input features of an item and a sample value of an output feature representing demand for the item, and training, based on the training data, an estimation model that estimates a new value of the output feature for the item based on new values of the one or more input features. The one or more input features may include a relative price of the item relative to prices of a plurality of items.

25 Claims, 6 Drawing Sheets

(56) References Cited

U.S. PATENT DOCUMENTS

2013/0325554 A1   12/2013  Ouimet
2014/0122173 A1*   5/2014  Wang ................. G06Q 30/0202
                                                                      705/7.31
2015/0288571 A1*  10/2015  Baughman ............ H04L 41/145
                                                                      703/21

* cited by examiner

TRAINING AN ESTIMATION MODEL FOR PRICE OPTIMIZATION

BACKGROUND

Technical Field

The present invention relates to training an estimation model for price optimization.

Description of the Related Art

A price elasticity model, which can be used to estimate demand for a product and determine a price that optimizes profit, can be constructed using known data, such as past prices and sales. See, for example, the abstracts of U.S. Pat. No. 8,694,346 and U.S. Patent Application Pub. Nos. 2013/0325554 and 2005/0149381. Through the use of technology such as IBM DemandTec™, it is possible to optimize price using such a model without the high cost and subjectivity associated with manual pricing. However, existing models and technologies often produce unrealistic optimal prices (e.g. 100 times current price) and have difficulty in areas where demand strongly depends on non-price factors, such as the travel date associated with the sale of a travel package.

SUMMARY

Therefore, it is an objective of an aspect of the innovations herein to provide a way of overcoming the above drawbacks accompanying the related art. The above and other objectives can be achieved by the combinations recited in the claims. A first aspect of the innovations herein may include a non-transitory computer readable storage medium having instructions embodied therewith, the instructions executable by a processor or programmable circuitry to cause the processor or programmable circuitry to perform operations comprising obtaining training date including a sample value of one or more input features of an item and a sample value of an output feature representing demand for the item, and training, based on the training data, an estimation model that estimates a new value of the output feature for the item based on new values of the one or more input features. The one or more input features may include a relative price of the item relative to prices of a plurality of items. Embodiments of the invention that include these features may support accurate estimation of demand or price elasticity of demand.

Training the estimation model may include generating, based on the training data, an estimation function whose input includes the new values of the one or more input features and whose output is the new value of the output feature. Embodiments of the invention that include these features may support accurate estimation of demand or price elasticity of demand using the estimation function.

Generating the estimation function may include minimizing or maximizing an objective function to find one or more parameters of the estimation function, and adding to the objective function a regularization term that influences the estimation function such that an optimal price or an optimal relative price determined by a utility function of the estimation function is closer to a standard price or a standard relative price of the item. The utility function may be maximized or minimized at the optimal price or the optimal relative price, and the regularization term may include a derivative of the utility function with respect to the price or relative price. Embodiments of the invention that include these features may support realistic price or relative price optimization using the estimation function.

Obtaining the training data may include receiving a price of the item and calculating the sample value of the relative price of the item. Obtaining the training data may further include obtaining an average price or price quantile of the plurality of items, and calculating the sample value may include calculating the sample value of the relative price of the item based on the price of the item and the average price or price quantile of the plurality of items. Obtaining the training data may further include obtaining an average price or price quantile and a standard deviation of price of the plurality of items, and calculating the sample value may include calculating the sample value of the relative price of the item based on the price of the item, the average price or price quantile of the plurality of items, and the standard deviation of the price of the plurality of items. Embodiments of the invention that include these features may support accurate estimation of demand or price elasticity of demand using absolute price data.

The one or more input features may further include an input feature representing a timing of a transaction or use of the item, and the training data may include a plurality of sets of a sample value of the one or more input features and a sample value of the output feature. Embodiments of the invention that include these features may support accurate estimation of demand or price elasticity of demand in the case where demand strongly depends on the timing of a transaction or use of the item.

A second aspect of the innovations herein may include an apparatus including the above computer readable storage medium of the first aspect and a processor operable to execute the instructions.

A third aspect of the innovations herein may include an apparatus including the above computer readable storage medium of the first aspect and programmable circuitry operable to execute the instructions.

A fourth aspect of the innovations herein may include an apparatus including means for performing the operations of the first aspect.

A fifth aspect of the innovations herein may include a method corresponding to the operations of the first aspect.

The summary clause does not necessarily describe all of the features of the embodiments of the present invention. The present invention may also be a combination or sub-combination of the features described above, including a combination of features from two or more of the aspects described above. The above and other features and advantages of the present invention will become more apparent from the following description of the embodiments, taken in conjunction with the accompanying drawings.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
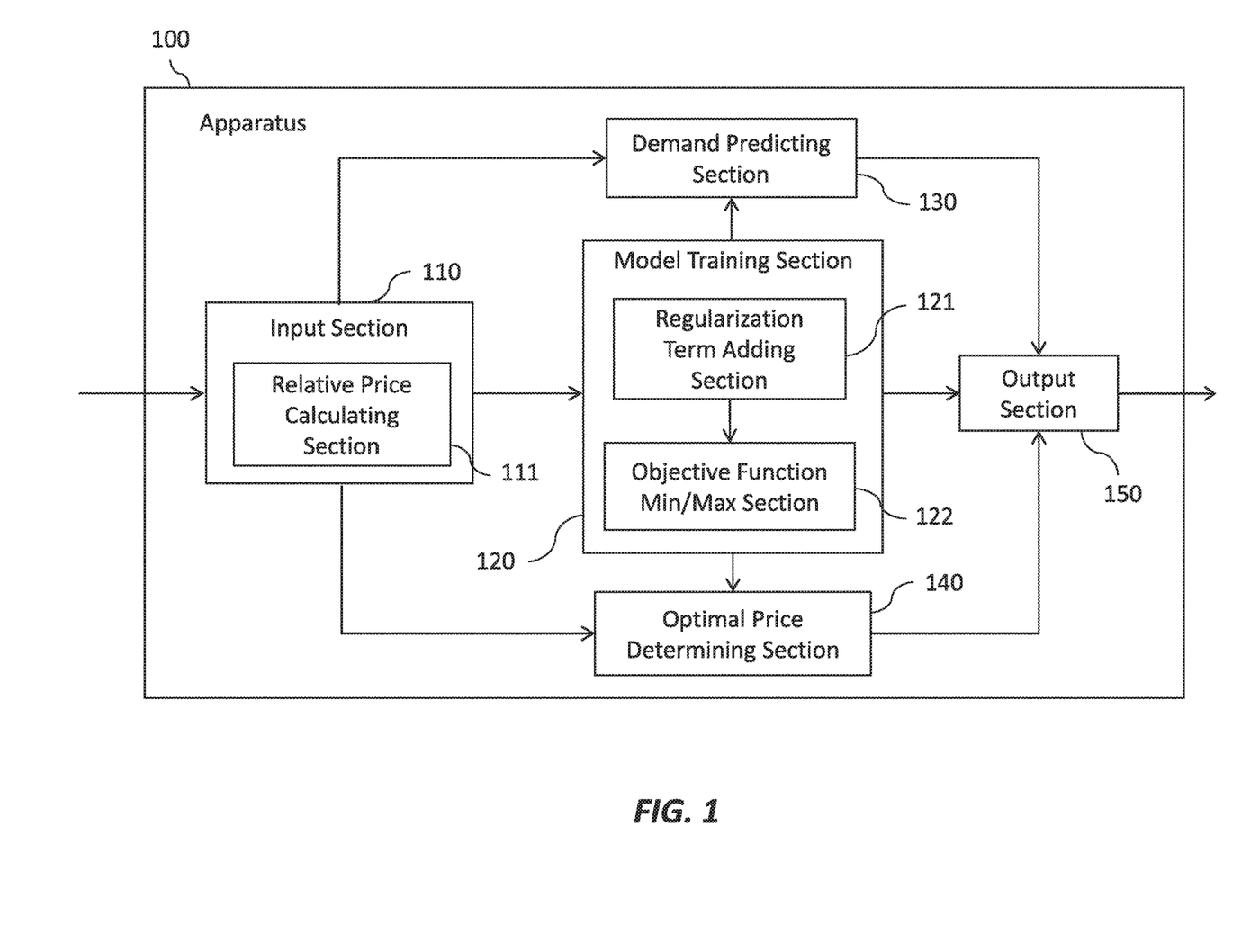
FIG. 1 shows an apparatus 100 according to an embodiment of the present invention.

FIG. 1 shows an apparatus 100 according to an embodiment of the present invention. The apparatus 100 obtains training data associated with an item such as a product or service and trains an estimation model based on the training data. Using the estimation model, the apparatus 100 may then predict demand for the item and/or determine an optimal price for the item. The apparatus 100 includes an input section 110, a model training section 120, a demand predicting section 130, an optimal price determining section 140, and an output section 150.

The input section 110 obtains training data including a sample value of one or more input features of an item and a sample value of an output feature representing demand for the item. The item may be any product or service that is sold, rented, leased, booked, or otherwise subject to a transaction. The one or more input features may include a relative price of the item relative to prices of a plurality of items. The one or more input features may further include, for example, characteristics of the item as well as the price of the item (e.g. dollar price), the price of other items, the timing of a transaction, the degree or cost of advertising associated with a transaction, the timing of use, etc. If, for example, the item is a hotel room, the one or more input features may include a relative price of staying in the hotel room, characteristics of the hotel room such as room size, room direction/orientation, room equipment, room location, hotel facilities, etc., as well as the stay date (month, day of week, etc.), number of visitors (number of adults, number of children, number of infants, etc.), etc. The output feature may be a measure of demand, such as number of sales, bookings, etc.

The training data may include a plurality of sets of a sample value of the one or more input features and a sample value of the output feature. For example, the one or more input features may include an input feature representing a timing of a transaction or use of the item and an associated relative price of the item. The values of such associated input features may be represented by the components of vectors $\vec{x}_1, \vec{x}_2, \ldots \vec{x}_N$ for N samples indexed by k, where $\vec{x}_{k1}=(x_{k1}, x_{k2}, \ldots, x_{kM})$ for M input features. The plurality of sets may thus be represented by N ordered pairs $(\vec{x}_k, y_k)$, where $y_k$ is the value of the output feature associated with the $k^{th}$ vector of input features, e.g. the demand associated with the timing and relative price in the above example.

In the example of the apparatus 100 shown in FIG. 1, the input section 110 includes a relative price calculating section 111. The input section 110 may receive a price of the item from outside the apparatus 100. For example, the price can be provided by direct user input, received from an external storage, or received from a computer or server through a network such as the Internet, WAN, and/or LAN. The relative price calculating section 111 may then calculate the sample value of the relative price of the item based on the price of the item received from outside the apparatus 100. In this way, the input section 110 may obtain training data including a sample value of relative price by calculating the relative price based on an input price. Alternatively or additionally, the input section 110 may obtain training data including a sample value of relative price by receiving the sample value of the relative price from outside the apparatus 100 in the same ways that the price may be received. For example, the input section 110 may accept user input of the sample value of the relative price of the item to a computer. In a case where the input section 110 only receives sample values of the relative price from outside the apparatus 100, the relative price calculating section 111 can be omitted.

The input section 110 may obtain sample values of other input features from outside the apparatus 100 in the same ways as the sample value of the relative price. In addition, the input section 110 may obtain, in the same ways, new values of the one or more input features, such as test values, hypothetical values, future values, etc. On the basis of such new values of the input features, the estimation model may predict a new value of the output feature as described below. The input section 110 may further obtain, in the same ways, any other inputs used by the apparatus 100.

The input section 110 may receive data of any of the above inputs through any combination of input device(s). For example, the input section 110 may be configured to receive mouse input, keyboard input, touchscreen input, eye tracking input, voice commands, and/or gestures. The input section 110 may receive the data from a remote user terminal or a remote user device.

The model training section 120 trains, based on the training data, an estimation model that estimates a new value of the output feature for the item based on new values of the one or more input features. The estimation model may be, for example, a price-elasticity model or a demand regression model. Training the estimation model may include generating, based on the training data, an estimation function whose input includes the new values of the one or more input features and whose output is the new value of the output feature. The model training section 120 includes a regularization term adding section 121 and an objective function min/max section 122.

The estimation function generated by the model training section 120 may have one or more parameters to be found using an objective function such that the estimation function fits the training data. Thus, as part of the generation of the estimation function, the objective function min/max section 122 may minimize or maximize an objective function to find one or more parameters of the estimation function, and the regularization term adding section 121 may add a regularization term to the objective function.

In the example of the apparatus 100 shown in FIG. 1, the model training section 120 includes the regularization term adding section 121 and the objective function min/max section 122. However, if the regularization term is not used, or if training the estimation model does not include generating an estimation function whose parameter(s) are found by minimizing or maximizing an objective function, the regularization term 121 and/or the objective min/max section 122 can be omitted.

The demand predicting section 130 predicts a new value of the output feature based on new values of the one or more input features using the estimation model. For example, the input section 110 may obtain new values of the one or more input features and provide the new values to the demand predicting section 130. The demand predicting section 130 may then predict the new value of the output feature using the estimation model and provide the predicted new value of the output feature to the output section 150.

The optimal price determining section 140 determines an optimal price or an optimal relative price for the item using the estimation model. For example, the input section 110 may obtain new values of some of the one or more input features, but not a new value of the relative price, and provide the new values to the optimal price determining section 140. The optimal price determining section 140 may then determine the optimal relative price using the estimation model and provide the determined optimal relative price to the output section 150. Alternatively, the input section 110 may obtain new values of some of the one or more input features, but not a new value of the price (e.g. dollar price), and provide the new values to the optimal price determining section 140. The optimal price determining section 140 may then determine the optimal price using the estimation model and provide the determined optimal price to the output section 150.

The output section 150 outputs one or more of the various outputs of the apparatus 100 for use by a downstream device or user. For example, the outputs may be stored, uploaded to a server, printed, displayed on a screen, or otherwise made available for viewing or analysis. The various outputs of the apparatus 100 output by the output section 150 may include, for example, the estimation model trained by the model training section 120, a new output value predicted by the demand predicting section 130, and/or an optimal price or an optimal relative price determined by the optimal price determining section 140. The output section 150 may further produce price elasticity information based on the estimation model (e.g. by finding the derivative) and output the price elasticity information.

The output section 150 may output any of the various outputs to an external storage or to a computer or server through a network such as the Internet, WAN, and/or LAN. The outputting may include storing, uploading to a server, printing, displaying on a screen, or otherwise making the various outputs available for viewing or analysis. The output section 150 may output any of the various outputs through any output device or combination of output devices. For example, the output section 150 may be configured to provide still or moving visual output, audio output, or vibration or other touch-based output via a screen, speaker, printer, or other output device. The output section 150 may provide the various outputs to a remote user terminal or a remote user device.

Figure 2:
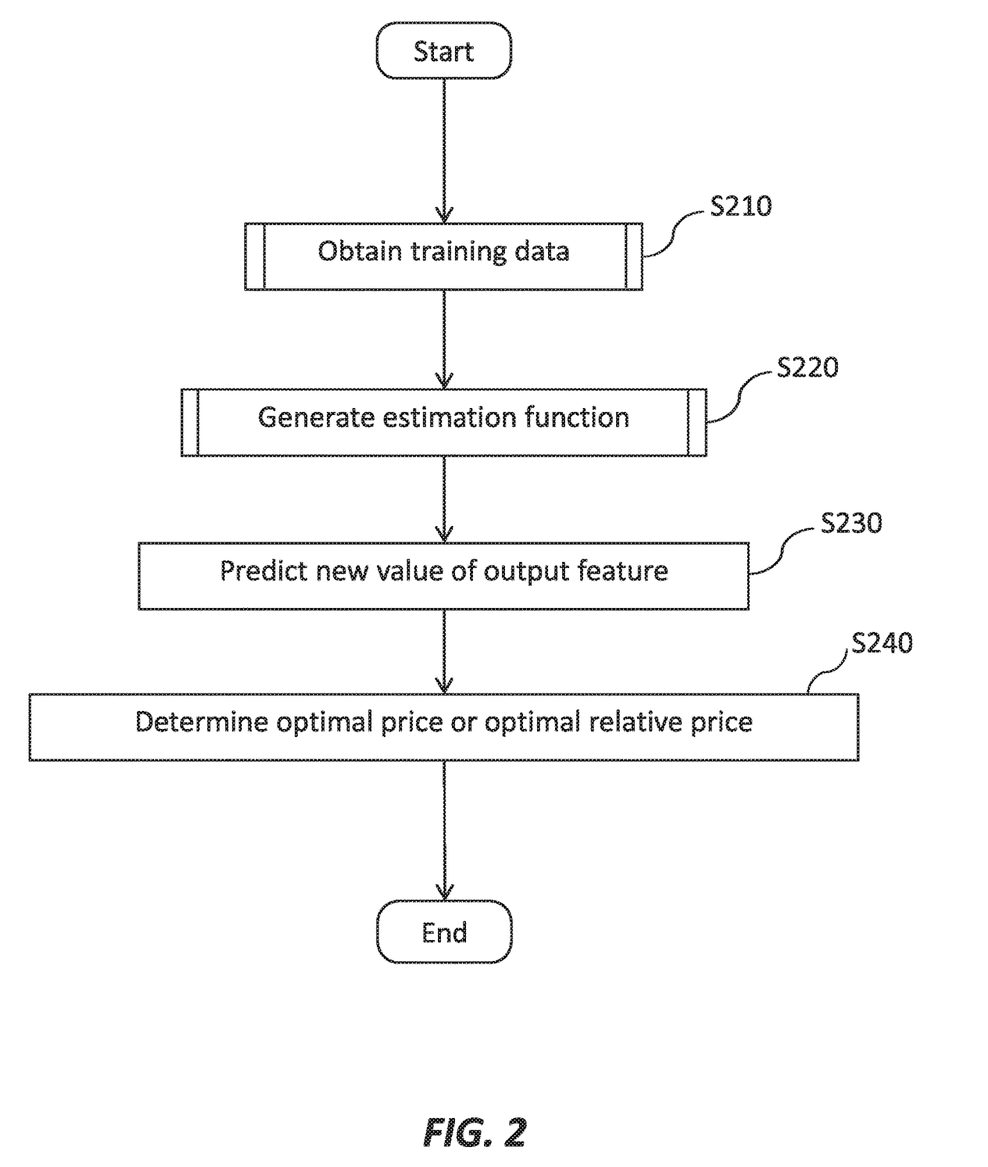
FIG. 2 shows an example operational flow of the apparatus 100 according to an embodiment of the present invention.

FIG. 2 shows an example operational flow of the apparatus 100 according to an embodiment of the present invention. In the example shown in FIG. 2, the apparatus 100 performs the operations from S210 to S240, but the apparatus 100 shown in FIG. 1 is not limited to using this operational flow. Also, the operational flow in FIG. 2 may be performed by a modified apparatus or a different apparatus that differs from the apparatus 100 shown in FIG. 1.

First, the apparatus 100 obtains training data including a sample value of one or more input features of an item and a sample value of an output feature representing demand for the item (S210). For example, the input section 110 of the apparatus 100 may obtain vectors $\vec{x}_1, \vec{x}_2, \ldots \vec{x}_N$ and output feature value $y_k$ for N samples indexed by k. Of the components $x_{k1}, x_{k2}, \ldots, x_{kM}$ of $\vec{x}_k$, assuming $x_{k1}$ are sample values of the relative price, the relative price calculating section 111 may generate $x_{k1}$ and the input section 110 may obtain the generated $x_{k1}$. Alternatively, the input section 110 may obtain $x_{k1}$ from outside the apparatus 100. In either case the input section 110 may obtain the sample values $x_{k2}, \ldots, x_{kM}$ of the other input features from outside the apparatus 100. The input section 110 may provide the obtained training data, e.g. as ordered pairs $(\vec{x}_k, y_k)$, to the model training section 120.

The example operational flow shown in FIG. 2 focuses on the generation of an estimation function as a part of (or as the entirety of) training an estimation model. Thus, as shown in FIG. 2, the apparatus 100 next generates, based on the training data, an estimation function whose input includes the new values of the one or more input features and whose output is the new value of the output feature (S220). For example, the model training section 120 of the apparatus 100 may generate an estimation function $y=F(\vec{x})$ using the training data, e.g. ordered pairs $(\vec{x}_k, y_k)$, obtained by the input section 110. The model training section 120 may provide the generated estimation function $y=F(\vec{x})$ to the demand predicting section 130, the optimal price determining section 140, and/or the output section 150.

Next, the apparatus 100 predicts a new value of the output feature based on new values of the one or more input features using the estimation function (S230). For example, the demand predicting section 130 of the apparatus 100 may input to the estimation function $y=F(\vec{x})$ a vector $\vec{x}_A$ whose components are new values of the input features (which may be obtained by the input section 110). The demand predicting section 130 may then provide the resulting new value $y_A$ of the output feature to the output section 150. In this way, the apparatus 100 may predict demand on the basis of test, hypothetical, or future values of the input features. Furthermore, depending on the one or more input features, the demand predicting section 130 may further predict the new value of the output feature per unit of an input feature, e.g. per day, rather than or in addition to total demand. For example, in the example of a hotel room as the item, the demand predicting section 130 may predict the demand for the hotel room for different days of the week or days of the year (e.g. weekdays, weekends, holidays, summer vacation, a day of a special event, etc.)

Lastly, the apparatus 100 determines an optimal price or an optimal relative price for the item using a utility function of the estimation function (S240). For example, given an estimation function $y=F(\vec{x})$ that outputs a value y representing demand for the item and assuming that a component $x_1$ of $\vec{x}$ is the price or relative price of the item, the utility function may be a function $p=g(x_1, F(\vec{x}))$ that outputs a value p representing a measure of profit, such as revenue minus cost associated with a transaction. If the utility function $p=g(x_1, F(\vec{x}))$ represents a measure of profit, the value of the price or relative price $x_1$ that maximizes p can be considered an optimal price or optimal relative price. Alternatively, if the utility function $p=g(x_1, F(\vec{x}))$ represents a measure of inverse profit, the value of the price or relative price $x_1$ that minimizes p can be considered an optimal price or optimal relative price. Alternatively, the utility function may represent a measure of some other quantity, such as sales, income, or surplus inventory (e.g. number of unused hotel rooms), either alone or in combination with profit or other quantities. Thus, the optimal price determining section 140 of the apparatus 100 may determine the optimal price or the optimal relative price by finding the price or relative price $x_1$ that maximizes or minimizes the utility function p, e.g. optimal price or optimal relative price $x_1^* = \text{argmax}_{x_1} g(x_1, F(\vec{x}))$. For example, the optimal price determining section 140 may input to the utility function $p = g(x_1, F(\vec{x}))$ an incomplete vector $\vec{x}_A$ whose components are new values of the input features (which may be obtained by the input section 110) but with the input feature $x_1$ left as a variable, along with further additional inputs of the utility function, e.g. inputs related to transaction expenses (which may also be obtained by the input section 110). The optimal price determining section 140 may then provide the resulting optimal price or optimal relative price $x_1^*$ to the output section 150. In this way, the apparatus 100 may determine an optimal price or an optimal relative price for the item.

In the example operational flow shown in FIG. 2, step S240 follows step S230. However, steps S230 and S240 may be performed independently of each other. Thus, depending on the intention of a user, the order of steps S240 and S230 may be reversed, or only one of steps S230 and S240 may be performed with the other omitted. If the desired output is only the estimation model or estimation function itself or price elasticity information thereof, steps S230 and S240 may both be omitted.

Figure 3:
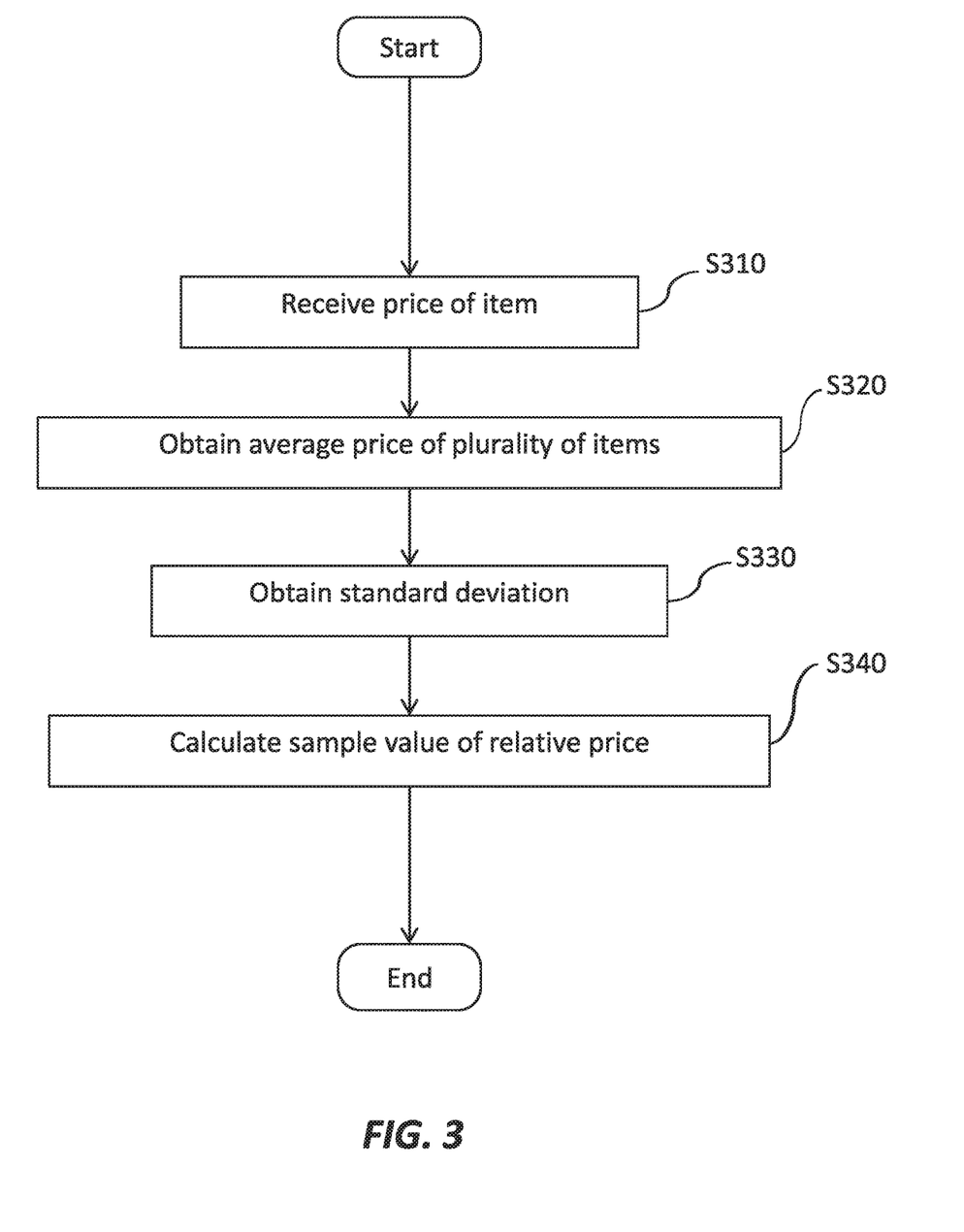
FIG. 3 shows an example operational flow of part of step S210 in FIG. 2.

FIG. 3 shows an example operational flow of part of step S210 in FIG. 2. Specifically, FIG. 3 shows an example of obtaining generated sample values $x_{k1}$ of the relative price. First, the input section 110 of the apparatus 100 may receive from outside the apparatus 100, for each of the N samples, a price associated with the sample values of the input features and output feature (S310). For example, the price may be the sale price of the item under the conditions represented by the sample values of the input feature. Then, the input section 110 may obtain an average price of a plurality of items (S320). The plurality of items may or may not include the item for which the learning data is obtained. The plurality of items may, for example, be a group of related items offered by the same business entity, such as a group of alternative items (e.g. different menu items, different hotel room types to book, different classes of travel ticket, etc.). Instead, the plurality of items may be a group of items including or limited to items offered by competitor business entities. The input section 110 may further obtain a standard deviation of the price of the plurality of items (S330). In steps S320 and S330, the average price and the standard deviation may be obtained by being received from outside the apparatus 100 in the same ways that the price of the item may be received in step S310. Alternatively, the input section 110 may obtain the average price and/or standard deviation through calculation based on input of individual prices (which may be received in the same ways that the price of the item may be received in step S310).

Lastly, the relative price calculating section 111 calculates the sample value $x_{k1}$ of the relative price of the item based on the price of the item received in step S310, the average price obtained in step S320, and the standard deviation obtained in step S330 (S340). For example, the relative price calculating section 111 may calculate the sample value $x_{k1}$ of the relative price of the item as a function of the difference between the price of the item and the average price, scaled by the standard deviation.

Figure 4:
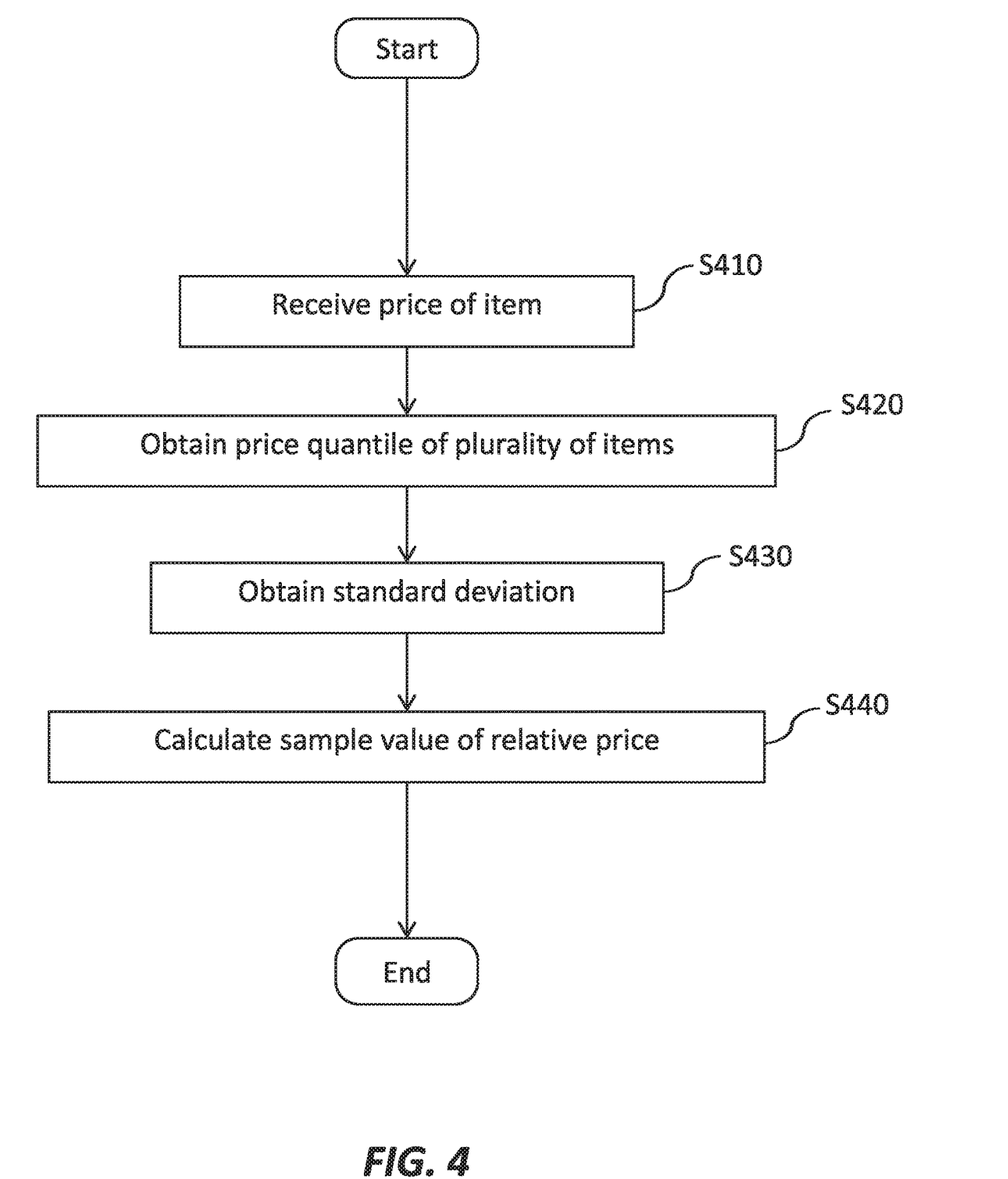
FIG. 4 shows an alternative example operational flow of a part of step S210 in FIG. 2.

FIG. 4 shows an alternative example operational flow of a part of step S210 in FIG. 2. Like FIG. 2, FIG. 3 shows an example of obtaining generated sample values $x_{k1}$ of the relative price. First, as in step S310 of FIG. 3, the input section 110 of the apparatus 100 may receive from outside the apparatus 100, for each of the N samples, a price associated with the sample values of the input features and output feature (S410). Then, instead of obtaining an average price of a plurality of items as in step S320 of FIG. 3, the input section 110 may obtain a price quantile of a plurality of items (S420). For example, the input section 110 may obtain a median, a quartile, or a percentile of the plurality of items. As in step S330 of FIG. 3, the input section 110 may further obtain a standard deviation of the price of the plurality of items (S430). In steps S420 and S430, the price quantile and the standard deviation may be obtained by being received from outside the apparatus 100 in the same ways that the price of the item may be received in step S410. Alternatively, the input section 110 may obtain the price quantile and/or standard deviation through calculation based on input of individual prices (which may be received in the same ways that the price of the item may be received in step S410).

Lastly, the relative price calculating section 111 calculates the sample value $x_{k1}$ of the relative price of the item based on the price of the item received in step S410, the price quantile obtained in step S420, and the standard deviation obtained in step S430 (S440). For example, the relative price calculating section 111 may calculate the sample value $x_{k1}$ of the relative price of the item as a function of the difference between the price of the item and the price quantile, scaled by the standard deviation.

The example operational flows shown in FIGS. 3 and 4 are only two of many examples. For instance, the order of steps S310 through S330, as well as the order of steps S410 through S430, can be freely modified as they do not necessarily depend on each other. Also, the average price and price quantile obtained in steps S320 and S420 are only examples of a base price for defining the relative price, where the base price can in principle be any price. Thus, steps S320 and S420 can be replaced with any designation of a base price. Similarly, the standard deviation is only an example of a scaling constant, which can take other forms or be entirely left out. Thus, steps S330 and S430 can be modified or omitted. For instance, the relative price calculating section 111 may calculate the sample value $x_{k1}$ of the relative price of the item based on the price of the item and the average price or price quantile.

In FIGS. 3 and 4, the received price in steps S310 and S410 may or may not be a sample value of an input feature. That is, in addition to the relative price, the one or more input features used to train the estimation model may or may not include the price (e.g. dollar price) of the item. In either case, the price of the item may be received in the same way by the input section 110.

By including a sample value of the relative price of the item in the learning data, the accuracy of the demand estimation can be improved. For example, in a case where demand strongly depends on non-price factors, a difference in absolute price may appear incorrectly to be the source of a difference in demand. If, for example, the price of a hotel room is around $100 on weekdays, around $150 on weekends, and around $200 during holidays, the difference in demand between a weekday hotel room and a holiday hotel room may appear to be caused by the price difference when it is actually caused by other input features. By using a relative price as an input feature, it is possible to more accurately reflect the price of a holiday hotel room relative to other holiday hotel room prices while reflecting the price of a weekday hotel room relative to other weekday hotel room prices.

Figure 5:
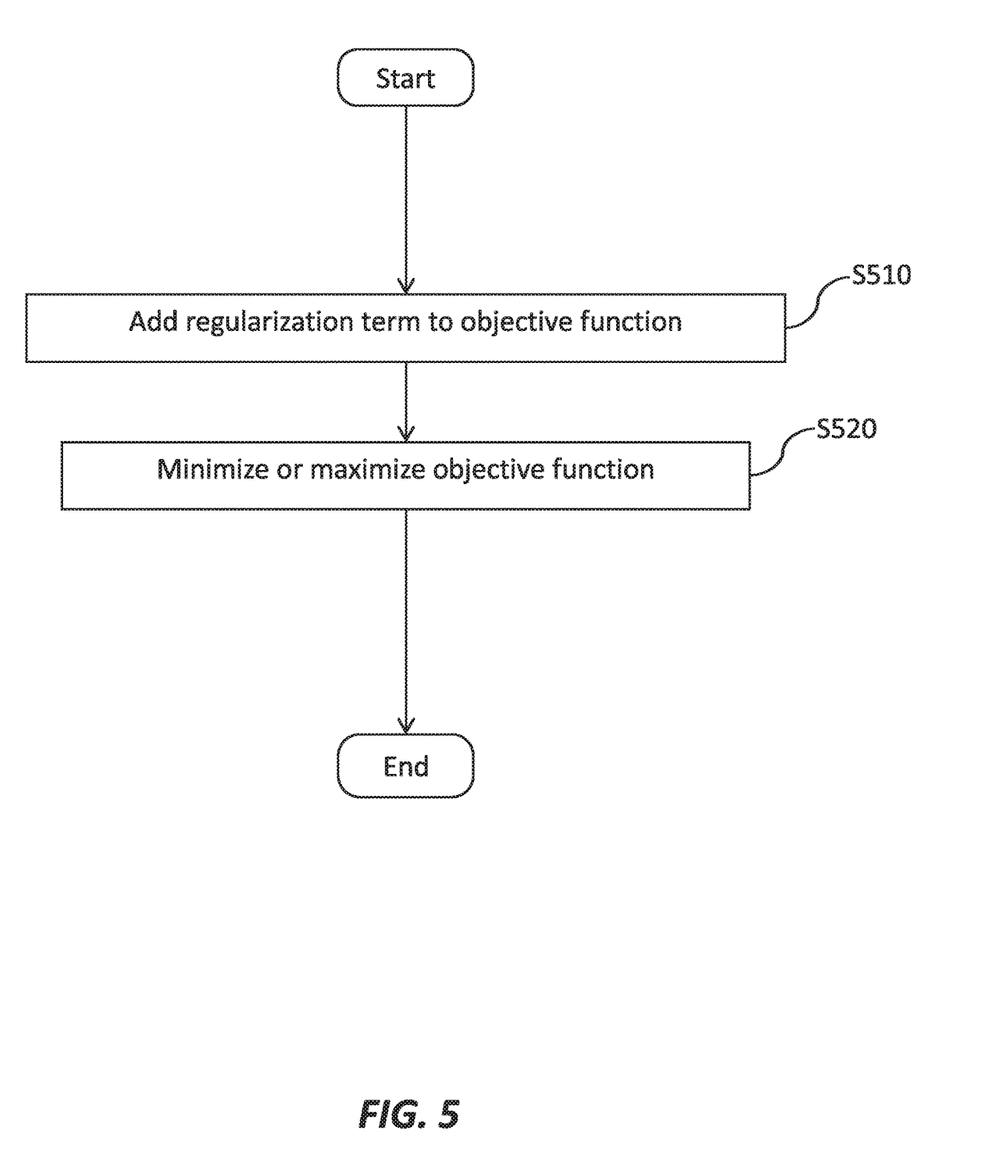
FIG. 5 shows an example operational flow of step S220 in FIG. 2.

FIG. 5 shows an example operational flow of step S220 in FIG. 2. After the apparatus 100 obtains training data in step S210 of FIG. 2, the apparatus 100 generates an estimation function as a part of (or as the entirety of) training an estimation model. For example, the model training section 120 of the apparatus 100 may generate an estimation function $y=F(\vec{x})$ whose parameters are found using an objective function such that the estimation function fits the training data. As an example, if the estimation function $y=F(\vec{x})$ is of the form $y=F(\vec{x})=w_1 f_1(x_1)+w_2 f_2(x_2)+ \ldots +w_M f_M(x_M)$, where $f_1, f_2, \ldots f_M$ and $w_1, w_2, \ldots w_M$ are functions and parameters associated with the estimation function's dependence on each of the M input features, an objective function of the form $Z=(F(\vec{x_1})-y_1)^2+(F(\vec{x_2})-y_2)^2+ \ldots +(F(\vec{x_N})-y_N)^2$, where $(\vec{x_k}, y_k)$ are the N ordered pairs of training data, may be minimized to yield appropriate functions $f_1, f_2, \ldots f_M$ and values of parameters $w_1, w_2, \ldots w_M$ such that the estimation function fits the training data. Thus, the objective function min/max section 122 may minimize an objective function (or maximize an objective function, depending on its form) to find one or more parameters of the estimation function (S520).

Prior to minimizing or maximizing the objective function in step S520, the model training section 120 may add additional terms, e.g. normalization terms, to the objective function. In the example operational flow of FIG. 5, the regularization term adding section 121 adds to the objective function a regularization term that influences the estimation function such that an optimal price or an optimal relative price determined by a utility function of the estimation function is closer to a standard price or a standard relative price of the item (S510). For example, the regularization term adding section 121 may add a regularization term that includes a derivative of the utility function with respect to price or relative price. As explained above, a utility function $p=g(x_1, F(\vec{x}))$, where the component $x_1$ of $\vec{x}$ is the price or relative price of the item, can be maximized or minimized to yield an optimal price or optimal relative price $x_1^*$. Thus, the derivative of such a utility function with respect to $x_1$ is equal to 0 at $x_1=x_1^*$. By including in the objective function a regularization term that includes a derivative of the utility function with respect to price or relative price (e.g. $\partial g(x_1, F(\vec{x}))/\partial x_1$ or a square or absolute value of such derivative), the objective function can be defined such that minimizing or maximizing the objective function brings the derivative of the utility function closer to zero. Thus, an estimation function generated using such an objective function will yield a utility function that tends to determine an optimal price or optimal relative price that is closer to whatever price or relative price value is given as the $x_1$ argument of the derivative of the utility function in the objective function. If the learning data $\vec{x_1}, \vec{x_2}, \ldots \vec{x_N}$ itself is used, e.g. with the regularization term including N sub-terms having the sample values $x_{k1}$ (price or relative price) as their $x_1$ arguments, the resulting optimal price or optimal relative price $x_1^*$ will effectively be closer to the sample values $x_{k1}$ of the training data. In this way, the apparatus 100 can generate an estimation model that produces realistic optimal prices or optimal relative prices.

As explained above, adding the regularization term to the objective function causes the optimal price or optimal relative price to be closer to some value determined by the $x_1$ argument of the regularization term. This value is referred to as the standard price or standard relative price. Thus, in the simple case where the $x_1$ argument of the regularization term is provided by a user (e.g. a catalog price), this argument can be regarded as the standard price or standard relative price (and may be received by the input section 110 in any of the ways that other data such as the training data is received). In the case where the sample values $x_{k1}$ are used as the $x_1$ arguments in N sub-terms of the regularization term, some value within the range of sample values $x_{k1}$ can be regarded as the standard price or standard relative price, whether the actual value is determined or not.

The apparatus 100 shown in FIG. 1, the operational flow shown in FIG. 2, and the various related and alternative embodiments described herein can support accurate estimation of demand or price elasticity of demand, as well as realistic price or relative price optimization. Due to these improvements in the results of the estimation model, the time and resources necessary to arrive at usable information are reduced relative to existing technologies such as IBM DemandTec™. Thus, the embodiments described herein improve such existing technologies by providing more efficient methods that require fewer resources (e.g. memory, processor load, etc.) to arrive at comparably useful results.

Figure 6:
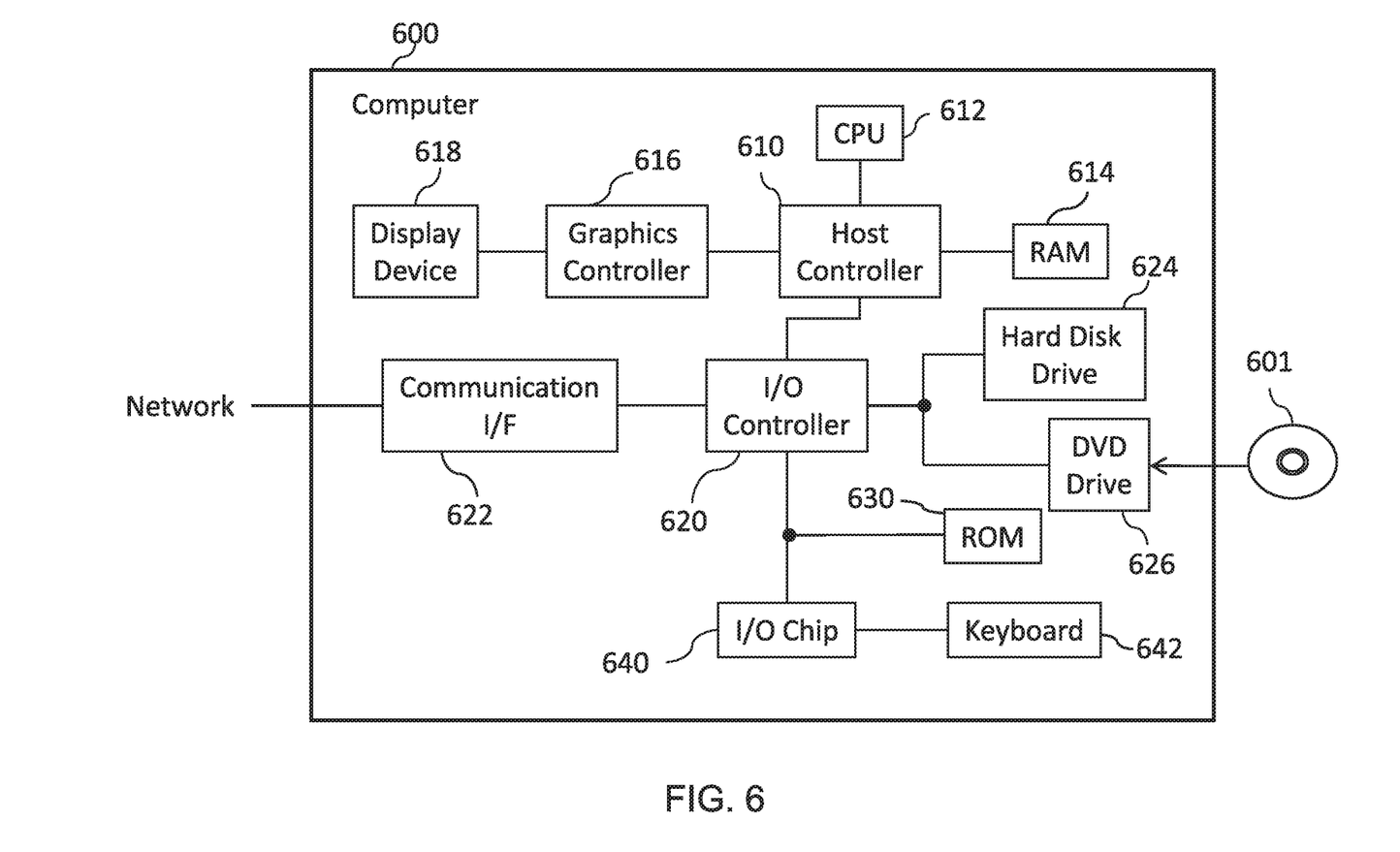
FIG. 6 shows an example of a computer 600 in which the apparatus 100, the operational flow of FIG. 2, and/or other embodiments of the claimed invention may be wholly or partly embodied.

FIG. 6 shows an example of a computer 600 in which the apparatus 100, the operational flow of FIG. 2, and/or other embodiments of the claimed invention may be wholly or partly embodied. The computer 600 according to the present embodiment includes a CPU 612, a RAM 614, a graphics controller 616, and a display device 618, which are mutually connected by a host controller 610. The computer 600 also includes input/output units such as a communication interface 622, a hard disk drive 624, and a DVD-ROM drive 626, which are connected to the host controller 610 via an input/output controller 620. The computer also includes legacy input/output units such as a ROM 630 and a keyboard 642, which is connected to the input/output controller 620 through an input/output chip 640.

The host controller 610 connects the RAM 614 with the CPU 612 and the graphics controller 616, which access the RAM 614 at a high transfer rate. The CPU 612 operates according to programs stored in the ROM 630 and the RAM 614, thereby controlling each unit. The graphics controller 616 obtains image data generated by the CPU 612 on a frame buffer or the like provided in the RAM 614, and causes the image data to be displayed on the display device 618. Alternatively, the graphics controller 616 may contain therein a frame buffer or the like for storing image data generated by the CPU 612.

The input/output controller 620 connects the host controller 610 with the communication interface 622, the hard disk drive 624, and the DVD-ROM drive 626, which are relatively high-speed input/output units. The communication interface 622 communicates with other electronic devices via a network. The hard disk drive 624 stores programs and data used by the CPU 612 within the computer 600. The DVD-ROM drive 626 reads the programs or the data from the DVD-ROM 601, and provides the hard disk drive 624 with the programs or the data via the RAM 614.

The ROM 630 and the keyboard 642 and the input/output chip 640, which are relatively low-speed input/output units, are connected to the input/output controller 620. The ROM 630 stores therein a boot program or the like executed by the computer 600 at the time of activation, a program depending on the hardware of the computer 600. The keyboard 642 inputs text data or commands from a user, and may provide the hard disk drive 624 with the text data or the commands via the RAM 614. The input/output chip 640 connects the keyboard 642 to the input/output controller 620, and may connect various input/output units via a parallel port, a serial port, a keyboard port, a mouse port, and the like to the input/output controller 620.

A program to be stored on the hard disk drive 624 via the RAM 614 is provided by a recording medium such as the DVD-ROM 601 or an IC card. The program is read from the recording medium, installed into the hard disk drive 624 within the computer 600 via the RAM 614, and executed in the CPU 612.

A program that is installed in the computer 600 can cause the computer 600 to function as an apparatus such as the apparatus 100 of FIG. 1. Such a program may act on the CPU 612 to cause the computer 600 to function as some or all of the sections, components, elements, databases, etc. of the apparatus 100 of FIG. 1 (e.g., the model training section 120, the optimal price determining section 140, etc.).

A program that is installed in the computer 600 can also cause the computer 600 to perform an operational flow such as the operational flow of FIG. 2. Such a program may act on the CPU 612 to cause the computer 600 to perform some or all of the steps of FIG. 2 (e.g., generate estimation function S220, determine optimal price or optimal relative price S240, etc.).

The information processing described in these programs is read into the computer 600, resulting in the cooperation between a program and the above-mentioned various types of hardware resources. An apparatus or method may be constituted by realizing the operation or processing of information in accordance with the usage of the computer 600.

For example, when communication is performed between the computer 600 and an external device, the CPU 612 may execute a communication program loaded onto the RAM 614 to instruct communication processing to the communication interface 622, based on the processing described in the communication program.

The communication interface 622, under control of the CPU 612, reads transmission data stored on a transmission buffering region provided in a recording medium such as the RAM 614, the hard disk drive 624, or the DVD-ROM 601, and transmits the read transmission data to a network or writes reception data received from a network to a reception buffering region or the like provided on the recording medium. In this way, the communication interface 622 may exchange transmission/reception data with a recording medium by a DMA (direct memory access) method or by a configuration in which the CPU 612 reads the data from the recording medium or the communication interface 622 of a transfer destination and writes the data into the communication interface 622 or the recording medium of the transfer destination, so as to transfer the transmission/reception data.

In addition, the CPU 612 may cause all or a necessary portion of a file or a database to be read into the RAM 614 such as by DMA transfer, the file or the database having been stored in an external recording medium such as the hard disk drive 624, the DVD-ROM drive 626 (DVD-ROM 601) and perform various types of processing on the data on the RAM 614. The CPU 612 may then write back the processed data to the external recording medium by means of a DMA transfer method or the like. In such processing, the RAM 614 can be considered to temporarily store the contents of the external recording medium, and so the RAM 614, the external recording apparatus, and the like are collectively referred to as a memory, a storage section, a recording medium, a computer readable medium, etc.

Various types of information, such as various types of programs, data, tables, and databases, may be stored in the recording apparatus to undergo information processing. Note that the CPU 612 may also use a part of the RAM 614 to perform reading/writing thereto on a cache memory. In such an embodiment, the cache is considered to be contained in the RAM 614, the memory, and/or the recording medium unless noted otherwise, since the cache memory performs part of the function of the RAM 614.

The CPU 612 may perform various types of processing on the data read from the RAM 614, which includes various types of operations, processing of information, condition judging, search/replace of information, etc., as described throughout this disclosure and designated by an instruction sequence of programs, and writes the result back to the RAM 614. For example, when performing condition judging, the CPU 612 may judge whether each type of variable is larger, smaller, no smaller than, no greater than, or equal to the other variable or constant, and when the condition judging results in the affirmative (or in the negative), the process branches to a different instruction sequence or calls a subroutine.

In addition, the CPU 612 may search for information in a file, a database, etc., in the recording medium. For example, when a plurality of entries, each having an attribute value of a first attribute is associated with an attribute value of a second attribute, are stored in a recording apparatus, the CPU 612 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 601, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 600 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A non-transitory computer readable storage medium having instructions embodied therewith, the instructions executable by a processor or programmable circuitry to cause the processor or the programmable circuitry to perform a method comprising:

collecting, by the processor or the programmable circuitry, sample characteristic data from external sources over a network;

training, by the processor or the programmable circuitry, data, including a sample value of one or more input features of an item and a sample value of an output feature representing demand for the item, from the characteristic data, the one or more input features including a relative price of the item relative to prices of a plurality of items collected from the external sources over the network;

training, by the processor or the programmable circuitry, based on the training data, an estimation model that estimates a new value of the output feature for the item based on new values of the one or more input features; and generating, by the processor or the programmable circuitry, an output feature, by the trained estimation model, representing demand for an actual item, the output feature rendered in a viewable form on a display of a remote user device coupled to the network.

2. The non-transitory computer readable storage medium of claim 1, wherein the training includes generating, based on the training data, an estimation function whose input includes the new values of the one or more input features and whose output is the new value of the output feature.

3. The non-transitory computer readable storage medium of claim 2, wherein the generating includes:
minimizing or maximizing an objective function to find one or more parameters of the estimation function; and
adding to the objective function a regularization term that influences the estimation function such that an optimal price or an optimal relative price determined by a utility function of the estimation function is closer to a standard price or a standard relative price of the item.

4. The non-transitory computer readable storage medium of claim 3, wherein
the utility function is maximized or minimized at the optimal price or the optimal relative price, and
the regularization term includes a derivative of the utility function with respect to a price or a relative price, of the item.

5. The non-transitory computer readable storage medium of claim 4, further comprising: determining the optimal price or the optimal relative price using the utility function.

6. The non-transitory computer readable storage medium of claim 2, further comprising:
predicting the new value of the output feature based on the new values of the one or more input features-using the estimation function.

7. The non-transitory computer readable storage medium of claim 1, further comprising:
predicting the new value of the output feature based on the new values of the one or more input features using the estimation model.

8. The non-transitory computer readable storage medium of claim 1, further comprise:
determining an optimal price or an optimal relative price for the item using the estimation model.

9. The non-transitory computer readable storage medium of claim 1, wherein the obtaining includes:
receiving a price of the item; and
calculating the sample value of the relative price of the item based on the price of the item.

10. The non-transitory computer readable storage medium of claim 9, wherein
the obtaining further includes obtaining an average price of the plurality of items; and
the calculating includes calculating the sample value of the relative price of the item based on the price of the item and the average price of the plurality of items.

11. The non-transitory computer readable storage medium of claim 9, wherein
the obtaining further includes obtaining an average price of the plurality of items and a standard deviation of price of the plurality of items, and
the calculating includes calculating the sample value of the relative price of the item based on the price of the item, the average price of the plurality of items, and the standard deviation of the price of the plurality of items.

12. The non-transitory computer readable storage medium of claim 9, wherein
the obtaining further includes obtaining a price quantile of the plurality of items, and
the calculating includes calculating the sample value of the relative price of the item based on the price of the item and the price quantile of the plurality of items.

13. The non-transitory computer readable storage medium of claim 9, wherein
the obtaining further includes obtaining a price quantile of the plurality of items and a standard deviation of price of the plurality of items, and
the calculating includes calculating the sample value of the relative price of the item based on the price of the item, the price quantile of the plurality of items, and the standard deviation of the price of the plurality of items.

14. The non-transitory computer readable storage medium of claim 1, wherein
the obtaining includes accepting user input of the sample value of the relative price of the item to a computer.

15. The non-transitory computer readable storage medium of claim 1, wherein
the one or more input features further includes an input feature representing a timing of a transaction or use of the item, and
the training data includes a plurality of sets of a sample value of the one or more input features and the sample value of the output feature.

16. An apparatus comprising:
the computer readable storage medium of claim 1; and
the processor operable to execute the instructions.

17. An apparatus comprising:
the computer readable storage medium of claim 1; and
the programmable circuitry operable to execute the instructions.

18. An apparatus comprising:
a processor;
a network interface coupling the processor to a network, the network interface configured to collect sample characteristic data from external sources over the network; and
a memory coupled to the processor, the memory comprises program instructions executable by the processor to cause the processor to obtain training data including a sample value of one or more input features of an item and a sample value of an output feature representing demand for the item from the characteristic data, the one or more input features including a relative price of the item relative to prices of a plurality of items collected from the external sources over the network; and
an estimation model trained using the training data, the estimation model being trained to estimate a new value of the output feature for the item based on new values of the one or more input features, such that an output feature, generated by the trained estimation model, representing demand for an actual item, is rendered in a viewable form on a display of a remote user device coupled to the network.

19. A method comprising:

collecting, by the processor or the programmable circuitry, sample characteristic data from external sources over a network;

obtaining, by the processor or the programmable circuitry, training data including a sample value of one or more input features of an item and a sample value of an output feature representing demand for the item from the characteristic data, the one or more input features including a relative price of the item relative to prices of a plurality of items collected from the external sources over the network;

training, by the processor or the programmable circuitry, based on the training data, an estimation model that estimates a new value of the output feature for the item based on new values of the one or more input features; and generating, by the processor or the programmable circuitry, an output feature, by the trained estimation model, representing demand for an actual item, the output feature rendered in a viewable form on a display of a remote user device coupled to a network.

20. The method of claim 19, wherein the training includes generating, based on the training data, an estimation function whose input includes the new values of the one or more input features and whose output is the new value of the output feature.

21. The method of claim 20, wherein the generating includes:

minimizing or maximizing an objective function to find one or more parameters of the estimation function; and adding to the objective function a regularization term that influences the estimation function such that an optimal price or an optimal relative price determined by a utility function of the estimation function is closer to a standard price or a standard relative price of the item.

22. The method of claim 21, wherein the utility function is maximized or minimized at the optimal price or the optimal relative price, and the regularization term includes a derivative of the utility function with respect to a price or a relative price, of an item.

23. The method of claim 22, further comprising: determining the optimal price or the optimal relative price using the utility function.

24. The method of claim 19, wherein the obtaining includes:

receiving a price of the item; and calculating the sample value of the relative price of the item based on the price of the item.

25. The method of claim 19, wherein the obtaining includes accepting user input of the sample value of the relative price of the item to a computer.

* * * * *